United States Patent [19]

Cook et al.

[11] 4,228,338
[45] Oct. 14, 1980

[54] PROCESS FOR IMPLANTING RADIOACTIVE METAL ON A SUBSTRATE

[75] Inventors: Nathan H. Cook, Cambridge, Mass.; Krishnamoorthy Subramanian, Inkster, Mich.

[73] Assignee: Massachusetts Institute of Technology, Cambridge, Mass.

[21] Appl. No.: 913,763

[22] Filed: Jun. 8, 1978

[51] Int. Cl.² ............................................. B23K 9/04
[52] U.S. Cl. ................................ 219/76.13; 219/70; 219/76.14; 219/77; 219/137 R
[58] Field of Search ................... 219/76.13, 76.14, 77, 219/70, 146.1, 137 R

[56] References Cited

U.S. PATENT DOCUMENTS

| | | | |
|---|---|---|---|
| 2,612,583 | 9/1952 | Bernard | 219/76.14 X |
| 2,806,128 | 9/1957 | Muller | 219/146.1 |
| 3,061,712 | 10/1962 | Inoue | 219/76.13 X |
| 3,098,150 | 7/1963 | Inoue | 219/76.13 X |
| 3,415,970 | 12/1968 | Cline | 219/76.14 X |

*Primary Examiner*—E. A. Goldberg
*Attorney, Agent, or Firm*—Arthur A. Smith, Jr.; Paul J. Cook

[57] ABSTRACT

A process for implanting a precise quantity of radioactive metal on a metal substrate such as a cutting tool or other metal part subject to wear at the area or areas where the part is expected to wear during its operation. The presence of the radioactive spot can be sensed to determine the extent of wear during use. The radioactive metal is deposited from a wire formed of a core of the radioactive metal surrounded by a sheath of metal having a high thermal and electrical conductivity relative to the core. In operation, the wire contacts the metal surface under pressure and electric current is passed through the wire in order to (1) form a pit on the tool surface, (2) weld the radioactive metal in the pit and (3) evaporate a small portion of the conductive sheath adjacent the pit. A second current then is passed through the wire to break it near the bottom of the pit, leaving a small quantity of radioactive material welded to the bottom of the pit.

4 Claims, 7 Drawing Figures

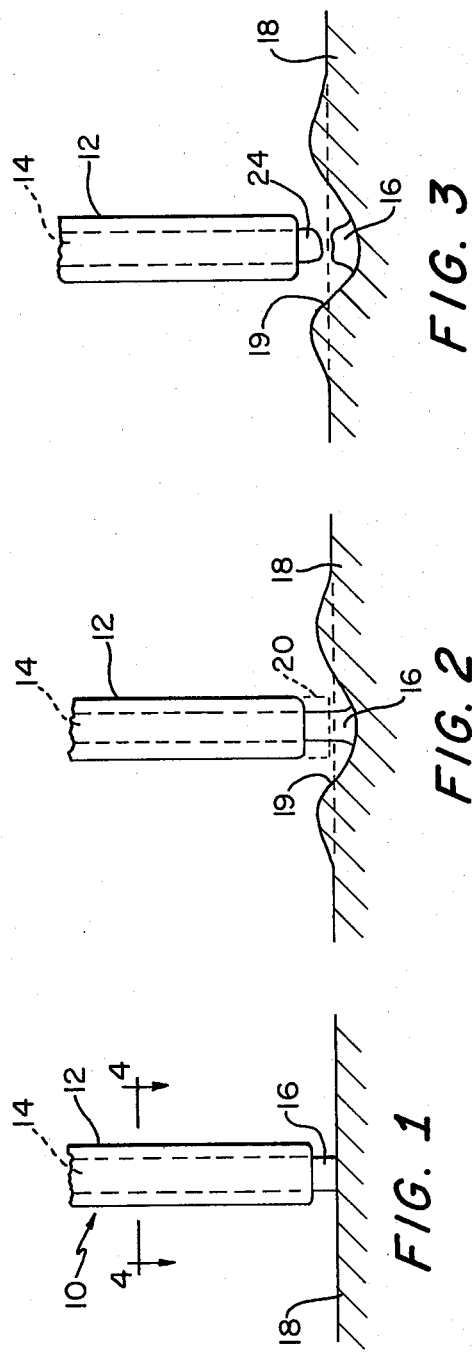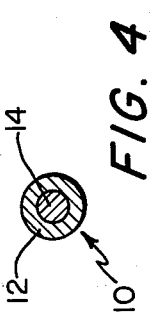

NON-DIMENSIONAL RELATIONSHIP BETWEEN FACTORS INFLUENCING THE SHORT CIRCUITING SPARK

OPERATING CHARACTERISTICS FOR IMPLANTATION USING SHORT CIRCUITING SPARK

CONTACT RESISTANCE AS A FUNCTION OF CONTACT FORCE

PROCESS FOR IMPLANTING RADIOACTIVE METAL ON A SUBSTRATE

BACKGROUND OF THE INVENTION

The Government has rights in this invention pursuant to Grant No. 7401015 and IPA-0010 awarded by the National Science Foundation. The Government has rights in this invention pursuant to Grant No. ENV-7401015 awarded by the National Science Foundation.

This invention relates to a process for implanting a precise amount of radioactive metal on a metal substrate part and to a wire construction used in the process.

A major problem associated with parts subject to wear, fracture or corrosion such as in tools used in metal cutting processes is the need for a reliable and inexpensive means for monitoring part condition. In the case of a cutting tool, for example, the manner in which a cutting tool wears varies with cutting conditions, the quality specifications of the part to be machined and the operation, i.e., turning, milling, drilling, etc. Generally, the failure of cutting tools can be classified as temperature failure, fracture of the cutting edge or gradual wear. While the form of gradual wear of a tool for a particular operation can be predicted with good accuracy, the life of the individual tools in the operation has been difficult to predict and has necessitated the use of statistical techniques to define the replacement time for the individual tools. Even when using statistical techniques, undesirable tool wear prior to replacement often occurs. This results in poor quality work and may cause premature stoppage of the automated metal cutting operation. In addition, the use of these techniques leads to the premature replacement of cutting tools, thereby increasing the cost of the manufacturing operation due to tool replacement and to work stoppage.

Presently, a wide variety of methods are available for sensing tool wear including indirect techniques which measure physical parameters resulting from tool wear and direct techniques which measure the tool wear itself. Representative indirect techniques measure mechanical vibrations, cutting temperature or electrical input to the cutting tool. Representative direct techniques include optical scanning measurement of tool geometry and radioactive techniques. Unfortunately, none of the available means for measuring tool wear are sufficiently accurate to permit a significant increase in the level of automation of metal cutting. In one particular prior art technique, the entire cutting tool bit is made radioactive. As the tool wears, particles are transferred from the tool to the chips produced. The chips are monitored and their radioactivity is used as a measure of tool wear rate. Because the volume of the tool material transferred to any small section of the chip is small, the radioactivity of the tool must be high, usually about 0.1 to 0.5 curie, and stringent safety precautions are necessitated. Furthermore, this relatively high radioactivity level only permits the use of this technique for a very small number of tools in a given work area.

It also has been proposed to render a cutting tool radioactive at low levels of about $10^{-8}$ to about $10^{-11}$ curies at a selected point or points on the tool where significant tool wear is expected under conditions of tool use. It has been proposed to render the tool radioactive by exposing it directly to irradiation such as proton or neutron radiation. However, this method is undesirable since it is slow and requires expensive equipment and radiation shields. It has been proposed also to apply a radioactive material from a wire made of a radioactive material by producing a spark discharge between the wire and the tool. This method is undesirable since it has proven very difficult to control the amount of radioactive material deposited on the tool with the requisite degree of precision. This is due primarily to the fact that the point at which the wire is broken from the deposited spot cannot be controlled accurately. Thus, this method of depositing radioactive metals on a tool is undesirable.

It would be desirable to provide a means for depositing precise quantities of radioactive material, regardless of the level of radioactivity of the material deposited, so that other conditions of use of the substrate such as corrosion resistance, wear resistance, fracture resistance or the like can be monitored accurately. The radioactive particle should be imbedded firmly in the tool surface, preferably by diffusion bonding, so that it is retained in place until wear progresses to its location. The active particle should not be on the tool surface, as it can be removed by mechanical wear long before the surface wear reaches the tool wear limit. Similarly, the active particle should not be located far below the tool surface as this will lead to one of the following problems: (a) shielding of the radioactivity by the tool material or (b) a relatively large volume of the tool material must be worn off before the active particle is removed from the tool.

SUMMARY OF THE INVENTION

In accordance with this invention, a radioactive metal is implanted on the surface of a metal substrate such as a tool by a spark discharge technique using two pulses applied to a wire in a timed sequence. The wire comprises a radioactive metal core surrounded by a sheath of relatively high conductive metal. In the first step, the wire is applied to the substrate under a slight pressure and an electric pulse is passed through the wire (1) to form a pit on the tool surface, (2) to weld the wire in the pit and (3) to evaporate a portion of the conductive sheath. The second electric pulse locally melts the exposed wire core near the weld zone resulting in implantation of a small quantity of radioactive metal in the pit.

BRIEF DESCRIPTION OF THE DRAWINGS

FIG. 1 is a side view of the wire in position on the tool surface.

FIG. 2 is a schematic view of the first step of this invention.

FIG. 3 is a schematic view of the second step of this invention.

FIG. 4 is a cross sectional view of the wire of this invention taken through line 4—4 of FIG. 1.

DESCRIPTION OF SPECIFIC EMBODIMENTS

Figure 5:
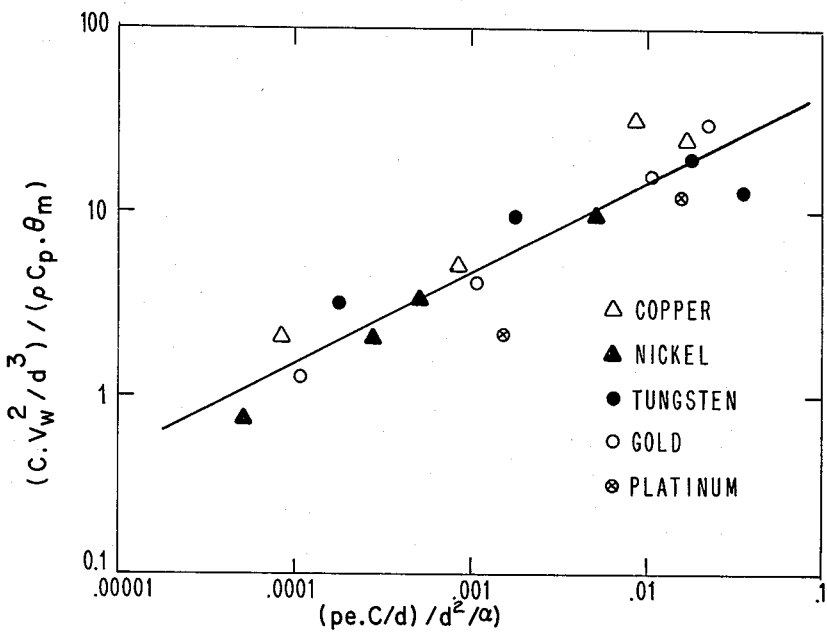
FIG. 5 is a graph showing the non-dimensional relationship between factors influencing the short circuit spark.

The process of this invention will be described for convenience with respect to a cutting tool. However, it is to be understood that this invention is useful for implanting a radioactive material on any metal surface that is subject to degradation during use such as by corrosion, wear, fracture or the like. In the process of this invention, a metal tool is rendered radioactive only at preselected points. These points are determined by the expected tool wear for a particular metal cutting process which can be predicted with good accuracy. For example, a common tool wear condition results from the formation of a wear land area on the cutting tool which is more or less a uniform zone on the flank of the tool. In general, the length of the wear land can become as large as about 0.01 to 0.05 inch before the tool is replaced. A second major source of tool wear results from the continuous contact of a chip and a face of the tool which eventually causes a dished out crater to form on the face of the tool. At low cutting speed or low temperatures, the crater wear is usually insignificant as compared to the wear land. The depth of the crater is generally maximum at a substantial distance from the initial cutting edge and the crater curvature corresponds to the radius of curvature of the chip. In general, as the crater grows, it will eventually intersect the wear land.

Other minor forms of wear are the nose radius wear which is a partial continuation of the wear land around the nose radius and partially a series of grooves. These grooves contribute to increase roughness of the finished part as wear progresses. Also, an outer diameter groove forms at the outer diameter of the work and can become quite large as compared to the other wear zones. However, since it is generally not associated with the finished surface of the work, this groove generally is not harmful except as it may affect regrinding time. Also, nose radius wear is a minor problem as compared to wear land and crater wear.

In accordance with this invention, the tool is rendered radioactive at a point selected so that it corresponds to the limit of crater wear and/or wear land which is between about 50 and 95%, usually between 90 and 95% of the amount of crater formation or land wear where tool failure has occurred. As stated above, tool failure for a given metal cutting operation can be predicted with good accuracy which permits the selective placement of the radioactive spots on the tool. A discussion of tool wear and how it can be predicted is set forth in the paper, "Tool Wear and Tool Life" appearing in Transactions of ASME, Journal of Engineering for Industry, Paper No. 72-WA/Prod-19 which is incorporated herein by reference.

When the tool is rendered radioactive at a point which corresponds to less than about 50% of the expected wear land or less than about 50% of the expected crater formation which represents tool failure, undesirable premature replacement results. When the tool is rendered radioactive at one point which corresponds to more than about 95% of the expected wear land or more than about 95% of the expected crater formation which represents tool failure, the risk of undesirable finished work is greatly increased.

In accordance with this invention, the cutting tool is rendered radioactive at at least one selected point where crater wear and/or wear land is formed as a result of tool use. The level of radioactivity depends upon the safety requirements in the environment of use. For example, in environments where a worker is exposed directly to the tool, the amount of radioactivity is between about $10^{-8}$ and $10^{-11}$ curie, preferably between about $10^{-8}$ and $10^{-10}$ curie at either point so that removal of the radioactive spot as a result of tool use can be determined with conventional radioactivity sensing apparatus without the need for high level radiation dosages on the tool. Typically, the radioactive spot has a zone smaller than about 0.005 in. × 0.005 in. by 0.001 in. thick. In environments where the worker is remote from the radioactive spot, the radioactivity can exceed the above levels such as when shielding is utilized or when the part subject to wear is located within the interior of an apparatus such as a piston or cylinder in an engine.

Referring to the drawings, the wire 10 comprises a core 12 of radioactive metal between about 0.0005 inch and 0.002 inch in diameter and a conductive sheath 14 formed from a metal of a higher electrical conductivity than the core. In the first step (FIG. 1), the wire 10 contacts the tool 18 at a pressure to effect proper electrical contact of the core protrusion 16 with the tool 18. Generally suitable contact forces are 100–200 mg giving a contact resistance of 100–400 ohms. An electrical current then is passed through the wire 10 to the tool 18 in order to form a pit 19 on the tool surface and to evaporate a portion of the conductive sheath 20 and to weld the core 16 to the tool surface in pit 19 (FIG. 2). By forming the pit 19 and welding the core 16 in the pit, the radioactive metal is implanted below the surface of the tool 18 and is not preferentially worn during tool use.

In the second step, an electrical pulse is passed through the wire 10 to the tool 18 and, due to the thermal constriction effected by only a portion of the sheath 12 being melted, the core 12 is melted to leave the implanted core portion 16 in the pit 10 and to leave a portion of exposed core 24 which can be used to form an implant by the process described above. Suitable electrical pulses can be obtained by applying a voltage through the wire of between about 20 and 80, preferably between about 30 and 50 volts. The timed sequence of the pulses can be controlled by conventional means such as a thryoton controlled pulse generating circuit, with a time between pulses of about 0.0001 sec, or the like. Sparking can be performed in air or in a dielectric liquid such as kerosene or mineral oil. It is preferred to utilize a dielectric liquid in order to minimize spattering.

In order to obtain the desired results, it is essential that the diameter of the wire core and the thickness of the conductive sheath be controlled with precision. In order to attain implantation of the core with the desired amount of radiation without the need for excessive amounts of implanted metal, the core should have a diameter between about 0.0005 inch and 0.002 inch, preferably between about 0.0008 inch and 0.0012 inch. If the diameter is too large, the implanted metal will protrude above the tool surface and will wear preferentially during tool use. Also, if the core diameter is too large, the desired welding and breaking of the core will be difficult to achieve in a consistent manner. If the core diameter is too small, it will be difficult also to control the process to effect welding, sheath evaporation and subsequent breaking of the core at the desired height. The core sizes given above merely are representative of those useful for a tool; the criteria being that which will promote a removal of radioactivity under conditions representative of undesirable degree of wear. In other environments, such as when attempting to determine wear of a railroad track, the core size employed will be larger. In other environments, the core can be smaller. The sheath should be formed of a conductive metal such as copper, silver or the like and should have a thickness of between about 0.0001 inch and 0.002 inch, preferably between about 0.0003 inch and 0.0008 inch. If the sheath is too thick, the desired selective sheath evaporation will not be attained and the core portion 24 will not be exposed after the implanation is effected. If the sheath is too thin, an excessive portion of the sheath will be evaporated during the first step which will result in implantation of an excessive amount of the core during the second step.

Representative useful radioactive metals which can be used as the wire core and their half lives are shown in Table I.

TABLE I

| Isotope | Half-Life (Days) |
| --- | --- |
| Hafnium - 181 | 42.2 |
| Iridium - 192 | 74.3 |
| Iron - 59 | 44.6 |
| Osmium - 191 | 15.3 |
| Ruthenium - 103 | 36.9 |
| Scandium - 46 | 83.8 |
| Terbium - 160 | 72.3 |
| Tungsten - 185 | 75.0 |
| Vanadium - 48 | 15.9 |

The bi-metallic wire can be formed by any conventional means such as electrical plating.

The particular range of voltage at which welding occurs during the first short circuiting spark is dependent upon the thermal and electrical properties of the electrode wire (core) and its size. It also depends upon the capacitance used in the circuit as it determines the input energy at the welding voltage and the time constant of the discharge circuit. The applicable equation is written as follows:

$$\frac{(C \cdot V_w^2/d^3)}{(\rho c_p \cdot \theta m)} = A \cdot \frac{(\rho_e \cdot C/d)}{(d^2/\alpha)} B \qquad \text{Equation I}$$

wherein
  $V_w$ = Voltage at which welding through short circuiting spark occurs (volts)
  C = Capacitance (Farad)
  $\rho_e$ = Electrical resistivity of the wire electrode (core) (ohm-in)
  K = Thermal Conductivity (in-lbs/in-sec° F.)
  $\rho C_p$ = Volumetric specific heat (in-lbs/in³° F.)
  $\theta m$ = Melting point (°F.)
  d = Diameter of the wire (in)
  $\alpha$ = Thermal diffusivity = $K/\rho c_p$ (in²/sec)
and A and B are constants. In order to determine A and B, different metals can be tested to obtain the plot shown in FIGS. 5 and 6. The metals used were tungsten, copper, nickel, gold or platinum each with a diameter of 0.001 inch. The wire was connected to a circuit which included a D.C. power supply, a capacitor, a charging current and a thyristor controlled trigger current. The metal to which the metal was to be welded was positioned under kerosene. The welding voltage for each metal was obtained at different values of the charging capacitance used. The data obtained was plotted to represent the non dimensional factors of Equation 1 as shown in FIG. 5 and a good correlation is observed in the relationship between the non dimensional factor where A is 150 and B is ½. In practice, welding occurs over a range of voltages for a given capacitance. The average of the voltage range is used for the data shown in FIG. 5.

When A is 150 and B is ½, Equation I can be rewritten as $$(U_w/U_m)\alpha(\tau_e/\tau_{th})^{\frac{1}{2}} \qquad \text{Equation 2}$$

wherein
  $U_w$ = Energy per unit volume of wire required for welding
  $U_m$ = Energy per unit volume of wire required to reach the melting point of the electrode material
  $\tau_e$ = Electrical time constant
  $\tau_{th}$ = Thermal time constant Equation 2 states that the ratio of energy for welding through short circuiting spark to the energy required to melt (both energies being considered per unit volume of the wire) is proportional to the square root of the ratio of the electrical and thermal time constants of the circuit containing the wire. For a given wire material of given size, $\rho_e$, K, $\theta m$, $\alpha$ and d all are constants. Then Equation 1 simplifies to $$C \cdot V_w^4 = A_1 \qquad \text{Equation 3}$$

wherein $A_1$ is a constant, the value of which depends upon the wire material. For the experimental conditions, Equations 2 and 3 have to be satisfied for obtaining a weld through a short circuiting spark and to produce a pit on the surface of the metal substrate. The feature of the short circuiting spark is that a pit is generated on the metal surface preceding the weld. In this respect, the short circuiting spark is different from pulsed spot welding. The input energy (E in) necessary to form the required pit, e.g., between about 5 and 15 millijoules for a tool is equal to the energy stored across the capacitor (C) in the circuit used to generate the spark. The input energy can be expressed as $$E \text{ in} = (C \cdot V_o^2)/2 \qquad \text{Equation 4}$$

wherein $V_o$ is the open circuit voltage across capacitor C. Equation 4 is plotted in FIG. 6 for 5 and 15 millijoules as E in. However, it must be bourne in mind that Equations 2 or 3 must be satisfied. For example, Equation 3 for a tungsten wire can be written as $$C \cdot V_w^4 = 64 \qquad \text{Equation 5}$$

Figure 6:
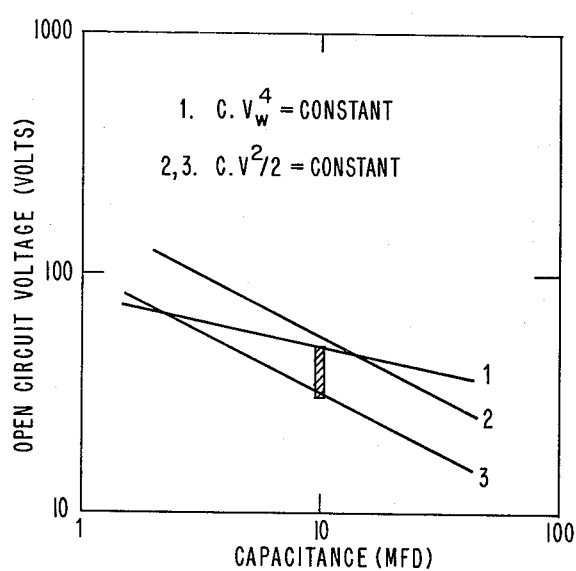
FIG. 6 is a representative graph showing the operating characteristics for implantation using a short circuiting spark.

Equation 5 also is shown in FIG. 6. From FIG. 6, it is seen that, at a capacitance of 10 micro farades, the input voltage for a tungsten wire should be about 50 volts to obtain a weld. Since this set of C and V satisfy the energy requirements, a short circuiting spark with satisfactory pit can be expected for a tool utilizing a radioactive level of about $10^{-8}$ to $10^{-11}$ curies with a wire of 0.001 inch diameter. Experimental evidence shows that a range of about 30 to 50 volts provides satisfactory results.

If the core wire (electrode) is not coated with electrically and thermally conducting metal, the wire will separate undesirably at a point about half its length under the influence of the second electrical pulse. When the core is coated with a metal having good thermal and electrical conductivity, e.g., silver or copper, the first short circuiting spark will cause the tip of the core wire to weld to the pit on the substrate and will cause the plating to evaporate due to the high temperature approximating the melting temperature of the core. This is achieved by controlling the thickness of the plating metal such that the tip of the wire electrode welded to the metal substrate becomes a thermal constriction. Under the conditions of voltage utilized above with a 0.001 inch tungsten wire, a plating thickness with copper of about 0.0005 inch has been found to satisfy the requirements so that only a small amount, i.e., the desired amount of wire core (tungsten) is deposited on the substrate by the second electrical pulse. During the first pulse, a spark is generated and, as it is quenched, the tip of the electrode is welded to the substrate. This results in an exponential decay of the voltage and current. During the second pulse, the melting of the core near the weld zone results in an open circuit.

Figure 7:
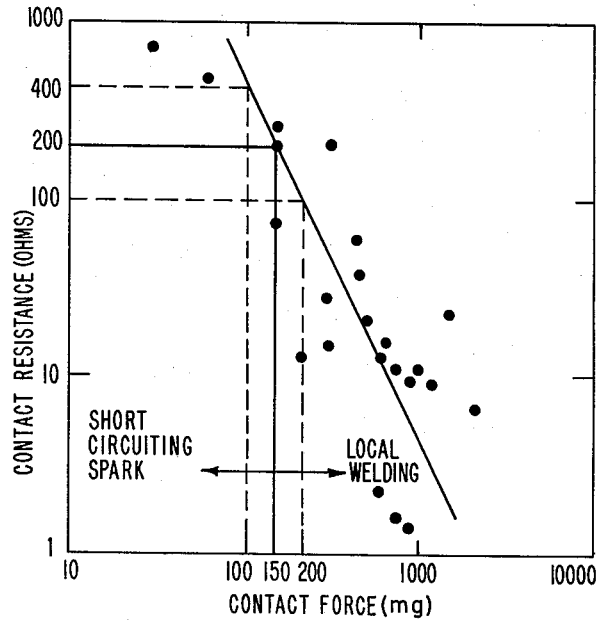
FIG. 7 is a representative graph showing contact resistance as a function of wire force.

In order to obtain the desired implantation, it is necessary to contact the wire to the substrate under moderate force. For example, at low contact resistance of less than about 200 ohms, the tip of the wire will be welded to the substrate with no apparent spark and without formation of the desired pit. At relatively high contact resistance, e.g. greater than about 200 ohms, a visible spark is generated which causes the tip of the wire to weld inside a shallow pit on the substrate. FIG. 7 shows a contact resistance of greater than about 200 ohms that is obtained with a contact force greater than about 150 mgs for a 0.001 inch diameter tungsten wire coated with 0.0005 inch copper when submerged in a kerosene, using an energy input of 5 to 15 milli joules, a voltage satisfying Equation 3.

In use, the final tool with the radiation spot is removed from the work upon completion of its cutting cycle and it is positioned so that the radioactive point is located adjacent a radiation sensing probe which is connected to a radiation counter. Any conventional radiation sensing and counting apparatus can be employed including a Geiger-Mueller counter, scintillation counter or solid state detector. Tool failure is determined when the level of radiation sensed is reduced by the amount of radiation emitted by one radioactive point even when one or more radioactive points are formed on the tool. This reduction in radiation level means that the tool has worn to a degree such that one of the preselected radioactive points has been removed from the tool as a result of use. When this condition occurs, the individual tool can be replaced with a minimum of work stoppage without replacing other tools performing the same work which were placed in operation at the same time as the worn tool.

After the radioactive spots have been generated on the tool, it can be overcoated or otherwise treated with a material which increases the life of the tool such as by diffusing a Group IVB or VB metal into the surface of a tungsten carbide tool or as set forth in abandoned copending application Ser. No. 324,889, filed Jan. 18, 1975, assigned to the assignee of this application or by the process described in U.S. Pat. No. 3,604,689, which is incorporated herein by reference.

While this invention has been described in detail with reference to implanting a radioactive metal from a wire having a radioactive core, it is evident that the process can be utilized for implanting a non-radioactive metal from a wire having a non-radioactive core. The non-radioactive metal implanted will have a characteristic which can be sensitized which is different from that of the metal substrate such as different magnetic properties or the like.

We claim:

1. The process for implanting a metal in a desired amount on the surface of a metal substrate subject to wear during use which comprises contacting to said substrate a wire comprising a metal core surrounded by a sheath of a conductive metal, said sheath of conductive metal having a thickness between about 0.0001 and 0.002 inch and a conductivity greater than that of said core, applying an electrical voltage across said wire and substrate to generate an electrical discharge in order to (a) form a pit on said substrate, (b) to weld the wire in said pit and (c) to evaporate a small portion of the conductive sheath adjacent said pit thereby to leave a portion of said core uncoated, and generating a second discharge through said wire in order to sever only a portion of the uncoated core adjacent said substrate.

2. The process of claim 1 wherein the wire comprises tungsten with tungsten 185 surrounded by a copper sheath.

3. The process of claim 1 wherein the voltage used to generate each spark is between about 20 and 80 volts.

4. The process of claim 1 wherein said metal core is radioactive.

* * * * *